US011881145B2

(12) United States Patent
Chen et al.

(10) Patent No.: US 11,881,145 B2
(45) Date of Patent: Jan. 23, 2024

(54) METHOD, DEVICE AND APPARATUS FOR DETERMINING BRIGHTNESS COMPENSATION PARAMETER

(71) Applicant: Kunshan New Flat Panel Display Technology Center Co., Ltd., Jiangsu (CN)

(72) Inventors: Feng Chen, Kunshan (CN); Junhui Lou, Kunshan (CN); Xiaoyu Gao, Kunshan (CN)

(73) Assignee: Kunshan New Flat Panel Display Technology Center Co., Ltd., Kunshan (CN)

( * ) Notice: Subject to any disclaimer, the term of this patent is extended or adjusted under 35 U.S.C. 154(b) by 0 days.

(21) Appl. No.: 17/984,659

(22) Filed: Nov. 10, 2022

(65) Prior Publication Data

US 2023/0075213 A1 Mar. 9, 2023

Related U.S. Application Data

(63) Continuation of application No. PCT/CN2021/093260, filed on May 12, 2021.

(30) Foreign Application Priority Data

Jul. 29, 2020 (CN) ......................... 202010747177.3

(51) Int. Cl.
*G09G 3/20* (2006.01)

(52) U.S. Cl.
CPC ... *G09G 3/2074* (2013.01); *G09G 2320/0233* (2013.01); *G09G 2320/0626* (2013.01); *G09G 2360/16* (2013.01)

(58) Field of Classification Search
None
See application file for complete search history.

(56) References Cited

U.S. PATENT DOCUMENTS

2010/0328339 A1* 12/2010 Cho .................... G09G 3/3426 345/589
2020/0135147 A1 4/2020 Tang et al.
(Continued)

FOREIGN PATENT DOCUMENTS

CN 106662750 A 5/2017
CN 108234824 A 6/2018
(Continued)

OTHER PUBLICATIONS

Notification of Transmittal of the International Search Report (including English translation) and the Written Opinion dated Jul. 30, 2021 in corresponding International Application No. PCT/CN2021/093260, 14 pages.

(Continued)

*Primary Examiner* — Amr A Awad
*Assistant Examiner* — Donna V Bocar
(74) *Attorney, Agent, or Firm* — Maier & Maier, PLLC

(57) ABSTRACT

A method, device, and apparatus for determining a brightness compensation parameter. The method includes: obtaining, at any grayscale, a plurality of first acquired brightness values of a plurality of first sub-pixels of a target color in the first display region and a plurality of second acquired brightness values of a plurality of second sub-pixels of the target color in the second display region of the display panel to be compensated; determining whether an acquisition ratio of an average value of the plurality of first acquired brightness values to an average value of the plurality of second acquired brightness values is within a standard range; correcting the plurality of first acquired brightness values or the plurality of second acquired brightness values to obtain a corrected brightness value of the display panel; determining the brightness compensation parameter of the display panel based on the corrected brightness value.

6 Claims, 8 Drawing Sheets

(56) References Cited

U.S. PATENT DOCUMENTS

| | | | | |
|---|---|---|---|---|
| 2021/0110787 | A1* | 4/2021 | Buckley | G09G 3/32 |
| 2022/0238057 | A1* | 7/2022 | Wang | G09G 3/2003 |

FOREIGN PATENT DOCUMENTS

| | | | |
|---|---|---|---|
| CN | 109559650 | A | 4/2019 |
| CN | 109976450 | A | 7/2019 |
| CN | 109979389 | A | 7/2019 |
| CN | 109981843 | A | 7/2019 |
| CN | 110189715 | A | 8/2019 |
| CN | 110349543 | A | 10/2019 |
| CN | 110599957 | A | 12/2019 |
| CN | 111681592 | A | 9/2020 |

OTHER PUBLICATIONS

Office Action dated Sep. 20, 2023, in corresponding Chinese Application No. 202010747177.3, 18 pages.

* cited by examiner

METHOD, DEVICE AND APPARATUS FOR DETERMINING BRIGHTNESS COMPENSATION PARAMETER

CROSS-REFERENCE TO RELATED APPLICATION

This application is a continuation of International Application No. PCT/CN2021/093260, filed on May 12, 2021, which claims priority to Chinese Patent Application No. 202010747177.3, filed on Jul. 29, 2020, both of which are hereby incorporated by reference in their entireties.

TECHNICAL FIELD

The present application relates to a technical field of display, and in particular to a method, device, and apparatus for determining a brightness compensation parameter.

BACKGROUND

With the rapid development of electronic devices, demands of users for the screen-to-body ratio are higher and higher, resulting in that the full-screen display of electronic devices attracts more and more attention in the industry.

At present, the design of the under-screen camera has appeared. The display brightness of the region corresponding to the camera is inconsistent with the display brightness of the normal display region of the display screen. Therefore, it is necessary to perform brightness compensation on the regions of the display screen. In the brightness compensation process, a brightness obtaining device is usually used to obtain the brightness of the display screen under each grayscale binding point. However, the brightness data acquired under some grayscale binding points has the problem of distortion, which in turn affects the compensation effect of the display screen.

SUMMARY

In a first aspect, the embodiments of the present application provide a method for determining a brightness compensation parameter, wherein the method is used for determining a brightness compensation parameter of a display panel to be compensated, the display panel to be compensated has a first display region and a second display region, and the method includes: obtaining, at any grayscale, a plurality of first acquired brightness values of a plurality of first sub-pixels of a target color in the first display region and a plurality of second acquired brightness values of a plurality of second sub-pixels of the target color in the second display region of the display panel to be compensated; determining whether an acquisition ratio of an average value of the plurality of first acquired brightness values to an average value of the plurality of second acquired brightness values is within a standard range, wherein the standard range is determined according to a sample display panel; correcting, under a condition that the acquisition ratio is not within the standard range, at least one of i) the plurality of first acquired brightness values or ii) the plurality of second acquired brightness values to obtain a corrected brightness value of the display panel to be compensated, so that a corrected ratio of an average brightness value of the plurality of first sub-pixels of the target color to an average brightness value of the plurality of second sub-pixels of the target color after correction is within the standard range, and wherein the corrected brightness value includes at least one of i) a plurality of first corrected brightness values of the plurality of first sub-pixels or ii) a plurality of second corrected brightness values of the plurality of second sub-pixels; using the corrected brightness value as a display brightness value of the display panel to be compensated, and determining the brightness compensation parameter of the display panel to be compensated based on the corrected brightness value.

In a second aspect, the embodiments of the present application provide a device for determining a brightness compensation parameter, wherein the device is used for determining a brightness compensation parameter of a display panel to be compensated, the display panel to be compensated has a first display region and a second display region, and the device includes: a brightness obtaining module configured to obtain, at any grayscale, a plurality of first acquired brightness values of a plurality of first sub-pixels of a target color in the first display region and a plurality of second acquired brightness values of a plurality of second sub-pixels of the target color in the second display region of the display panel to be compensated; a determination module configured to determine whether an acquisition ratio of an average value of the plurality of first acquired brightness values to an average value of the plurality of second acquired brightness values is within a standard range, wherein the standard range is determined according to a sample display panel; a correction module configured to correct, under a condition that the acquisition ratio is not within the standard range, at least one of i) the plurality of first acquired brightness values or ii) the plurality of second acquired brightness values to obtain a corrected brightness value of the display panel to be compensated, so that a corrected ratio of an average brightness value of the plurality of first sub-pixels of the target color to an average brightness value of the plurality of second sub-pixels of the target color after correction is within the standard range, and wherein the corrected brightness value includes at least one of i) a plurality of first corrected brightness values of the plurality of first sub-pixels or ii) a plurality of second corrected brightness values of the plurality of second sub-pixels; a compensation parameter determination module configured to use the corrected brightness value as a display brightness value of the display panel to be compensated, and determine the brightness compensation parameter of the display panel to be compensated based on the corrected brightness value.

In a possible implementation of the second aspect, the compensation parameter determination module is specifically configured to: determine a first average brightness value of the first display region according to the plurality of first corrected brightness values of the plurality of first sub-pixels; determine a second average brightness value of the second display region according to the plurality of second acquired brightness values of the plurality of second sub-pixels; determine a first grayscale value corresponding to the first average brightness value and a second grayscale value corresponding to the second average brightness value according to a correspondence relationship between brightness values of the display panel to be compensated and grayscale values; use a difference between the second grayscale value and the first grayscale value as the compensation grayscale value for the plurality of first sub-pixels.

In a third aspect, the embodiments of the present application provide an apparatus for determining a brightness compensation parameter, including a processor and a memory having a computer program stored thereon and executable by the processor, wherein the computer program when executed by the processor implements the method for determining a brightness compensation parameter in the technical solution of the first aspect.

According to the method, device, and apparatus for determining a brightness compensation parameter provided by the embodiments of the present application, after correcting at least one of i) the plurality of first acquired brightness values or ii) the plurality of second acquired brightness values to obtain a corrected brightness value, the corrected ratio of the average brightness value of the plurality of first sub-pixels of the target color to the average brightness value of the plurality of second sub-pixels of the target color after correction is within the standard range. Then, the brightness compensation parameter of the display panel to be compensated is determined based on the corrected brightness value. The corrected brightness value is more in line with the actual display situation of the display panel to be compensated. That is, the problem of distortion of the plurality of first acquired brightness values and/or the plurality of second acquired brightness values due to the instability of the brightness obtaining device can be avoided. Further, a reasonable corrected brightness value can be used to determine the brightness compensation parameter of the display panel to be compensated, thereby improving the compensation effect of the display panel and improving the display uniformity of the display panel.

BRIEF DESCRIPTION OF THE DRAWINGS

Other features, objects, and advantages of the present application will become more apparent from the following detailed description of non-limiting embodiments with reference to the accompanying drawings, in which like or similar reference characters refer to the same or similar features, and the drawings are not necessarily drawn to scale.

DETAILED DESCRIPTION

Features and exemplary embodiments of various aspects of the present application will be described in detail below. In order to make the objects, technical solutions and advantages of the present application clear, the present application will be further described in detail below in conjunction with the drawings and embodiments. It should be understood that the specific embodiments described herein are only configured for explaining the present application, and not configured for limiting the present application. For a person skilled in the art, the present application may be implemented without some of these specific details. The following descriptions of the embodiments are merely to provide a better understanding of the present application by illustrating the examples of the present application.

The display panel in the embodiments of the present application may be an organic light emitting diode (OLED) display panel, or a liquid crystal display panel, which is not limited herein.

Figure 1:
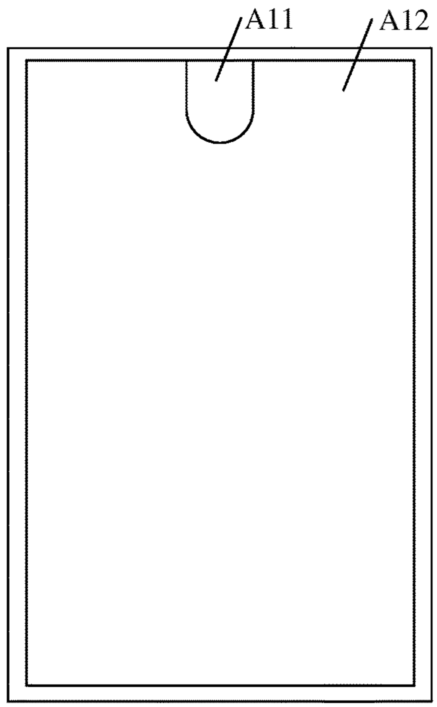
FIG. 1 is a schematic diagram of an example of a display panel provided by an embodiment of the present application.

FIG. 1 is a schematic diagram of an example of a display panel provided by an embodiment of the present application. As shown in FIG. 1, the display panel has a first display region A11 and a second display region A12. The light transmittance of the first display region A11 may be greater than the light transmittance of the second display region A12. The first display region A11 is a transparent display region, which can be regarded as a secondary screen region of the display panel. The second display region A12 can be regarded as a main screen region of the display panel.

In some examples, the light transmittance of the first display region A11 may be 15% or more. In order to ensure that the light transmittance of the first display region A11 is greater than 15%, greater than 40%, or even higher, the light transmittance of each of the functional film layers of the display panel in this embodiment may be greater than 80%, and the light transmittance of at least some of the functional film layers may be even greater than 90%.

The first display region may include first sub-pixels of at least three colors. For example, the first display region may include red first sub-pixels, blue first sub-pixels, and green first sub-pixels. The second display region may include second sub-pixels of at least three colors. For example, the second display region may include red first sub-pixels, blue first sub-pixels, and green first sub-pixels.

Photosensitive components can be integrated on the back side of the first display region A11 of the display panel of the embodiments of the present application, thereby achieving the under-screen integration of the photosensitive components, such as a camera. The first display region A11 can also display images, which increases the display area of the display panel and realizes the full-screen design of the display device.

In order to ensure that the light transmittance of the first display region A11 can meet the standard requirements, the pixel density and the driving circuit structure design in the first display region A11 are different from those in the second display region A12. Due to the difference between the first display region A11 and the second display region A12, the visual brightness of the first display region A11 and the visual brightness of the second display region A12 are different. The visual brightness of the first display region A11 refers to the brightness of the first display region A11 perceived by human eyes. The visual brightness of the second display region A12 refers to the brightness of the second display region A11 perceived by human eyes. In order to improve the display effect, Demura compensation can be performed on the display panel, so as to reduce the difference between the visual brightness of the first display region A11 and the visual brightness of the second display region A12 and improve the display effect.

In the process of Demura compensation, it is necessary to use an image acquisition device to obtain the brightness data of the first display region A11 and the second display region A12 of the display panel under different grayscales, and then perform Demura compensation on the display panel according to the brightness data acquired by the image acquisition device. However, due to the instability of the image acquisition device, the brightness acquired by the image acquisition device may not be the actual display brightness of the display panel. That is, the brightness data acquired by the image acquisition device is distorted. Determining the compensation parameter according to the distorted brightness data and performing Demura compensation on the display panel will reduce the compensation effect, or even deteriorate the compensation effect.

In order to solve the above-mentioned problems, the embodiments of the present application provide a method, device, and apparatus for determining a brightness compensation parameter. Various embodiments of the method, device, and apparatus for determining a brightness compensation parameter will be described in detail with reference to the accompanying drawings.

Figure 2:
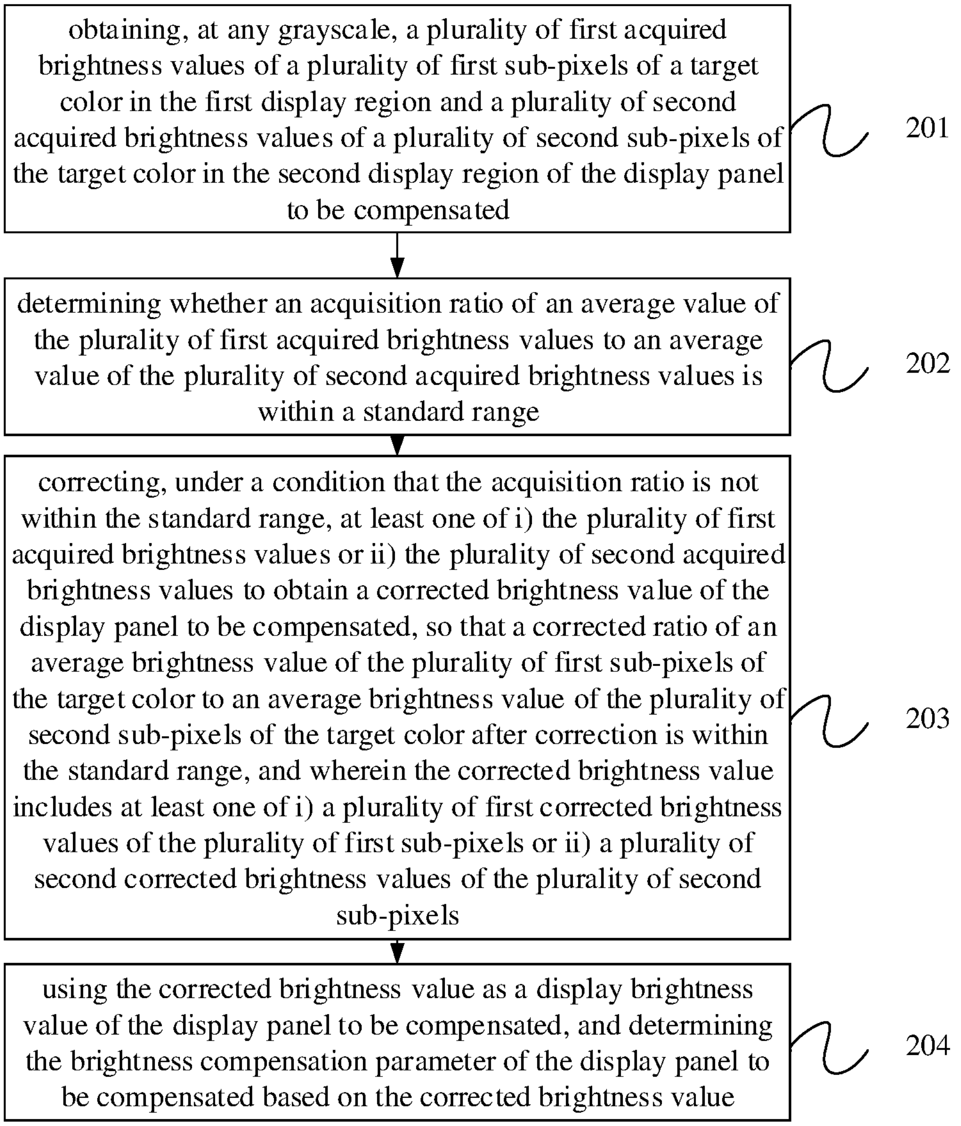
FIG. 2 is a schematic flowchart of a method for determining a brightness compensation parameter provided by an embodiment of the present application.

The embodiments of the present application provide a method for determining a brightness compensation parameter. FIG. 2 is a schematic flowchart of an example of a method for determining a brightness compensation parameter provided by an embodiment of the present application. As shown in FIG. 2, the method for determining a brightness compensation parameter may include steps 201 to 204.

In step 201: obtaining, at any grayscale, a plurality of first acquired brightness values of a plurality of first sub-pixels of a target color in the first display region and a plurality of second acquired brightness values of a plurality of second sub-pixels of the target color in the second display region of the display panel to be compensated.

In step 202: determining whether an acquisition ratio of an average value of the plurality of first acquired brightness values to an average value of the plurality of second acquired brightness values is within a standard range.

Here, the standard range is determined according to a sample display panel.

In step 203: correcting, under a condition that the acquisition ratio is not within the standard range, at least one of i) the plurality of first acquired brightness values or ii) the plurality of second acquired brightness values to obtain a corrected brightness value of the display panel to be compensated, so that a corrected ratio of an average brightness value of the plurality of first sub-pixels of the target color to an average brightness value of the plurality of second sub-pixels of the target color after correction is within the standard range, and wherein the corrected brightness value includes at least one of i) a plurality of first corrected brightness values of the plurality of first sub-pixels or ii) a plurality of second corrected brightness values of the plurality of second sub-pixels.

In step 204: using the corrected brightness value as a display brightness value of the display panel to be compensated, and determining the brightness compensation parameter of the display panel to be compensated based on the corrected brightness value.

In the embodiments of the present application, after correcting at least one of i) the plurality of first acquired brightness values or ii) the plurality of second acquired brightness values to obtain a corrected brightness value, the corrected ratio of the average brightness value of the plurality of first sub-pixels of the target color to the average brightness value of the plurality of second sub-pixels of the target color after correction is within the standard range. Then, the brightness compensation parameter of the display panel to be compensated is determined based on the corrected brightness value. The corrected brightness value is more in line with the actual display situation of the display panel to be compensated. That is, the problem of distortion of the plurality of first acquired brightness values and/or the plurality of second acquired brightness values due to the instability of the brightness obtaining device can be avoided. Further, a reasonable corrected brightness value can be used to determine the brightness compensation parameter of the display panel to be compensated, thereby improving the compensation effect of the display panel and improving the display uniformity of the display panel.

Exemplarily, in step 201, the any grayscale may be any grayscale that can be displayed by the display panel. For example, the grayscale range of the display panel can be 0-255, and the any grayscale can be any value within 0-255. For example, in the process of determining the compensation parameter of the display panel, the compensation parameters corresponding to some specified grayscale binding points may be determined firstly, and then the compensation parameters corresponding to grayscales other than the grayscale binding points may be determined by a linear interpolation method. Specifically, the any grayscale may be any one of grayscale 32, grayscale 64, grayscale 96, grayscale 128, grayscale 160, grayscale 192, grayscale 224, and grayscale 255. For the sake of clarity, hereinafter, the any grayscale is denoted as the first grayscale. It should be understood that the first grayscale may be any grayscale value.

Exemplarily, before step 201, a first grayscale picture may be input to the display panel to be compensated to light up the display panel to be compensated. After the display panel to be compensated is light up, the image acquisition device installed on the machine can be used to photograph the display panel to be compensated, so as to obtain the brightness data of the display panel to be compensated, and generate CSV data. The image acquisition device may be a high-resolution and high-precision camera such as a charge coupled device (CCD) camera. The entire display region of the display panel to be compensated may be photographed, that is, the photographed region includes the entire first display region and the entire second display region. A plurality of first acquired brightness values of all first sub-pixels of the target color in the first display region under the first grayscale and a plurality of second acquired brightness values of all second sub-pixels of the target color in the second display region under the first grayscale are acquired. In addition, a portion of the display region of the display panel to be compensated may be photographed, that is, the photographed region may include the entire first display region and a portion of the second display region, or the photographed region may include a portion of the first display region and a portion of the second display region. A plurality of first acquired brightness values of all first sub-pixels of the target color in the first display region under the first grayscale and a plurality of second acquired brightness values of a portion of the second sub-pixels of the target color in the second display region under the first grayscale are acquired. Alternatively, a plurality of first acquired brightness values of a portion of the first sub-pixels of the target color in the first display region under the first grayscale and a plurality of second acquired brightness values of a portion of the second sub-pixels of the target color in the second display region under the first grayscale are acquired. The portion of the second display region may be selected from the regions around the first display region, which is not limited herein.

The first acquired brightness values and the second acquired brightness values refer to the brightness values acquired by the image acquisition device. Due to the instability of the image acquisition device, the first acquired brightness values and the second acquired brightness values may be different from the brightness actually displayed on the display panel.

The CSV data may include the first acquired brightness values of the first sub-pixels of the target color under the first grayscale and the second acquired brightness values of the second sub-pixels of the target color under the first grayscale in the photographed region of the display panel to be compensated. The CSV data can be specifically implemented as a CSV data file. That is, the CSV data file stores the first acquired brightness values of the first sub-pixels of the target color under the first grayscale and the second acquired brightness values of the second sub-pixels of the target color under the first grayscale in the photographed region of the display panel. For example, the CapRas_032_B.CSV file stores the first acquired brightness values of the first sub-pixels of the blue color under the grayscale 32 and the second acquired brightness values of the second sub-pixels of the blue color under the grayscale 32 in the photographed region of the display panel. For another example, the CapRas_224_R.CSV file stores the first acquired brightness values of the first sub-pixels of the red color under the grayscale 224 and the second acquired brightness values of the second sub-pixels of the red color under the grayscale 224 in the photographed region of the display panel to be compensated.

In some examples, the first acquired brightness values of the first sub-pixels of the target color under the first grayscale in the first display region of the display panel to be compensated and the second acquired brightness values of the second sub-pixels of the target color under the first grayscale in the second display region of the display panel to be compensated can be acquired by photographing the display panel twice, which is not limited herein. For example, the first acquired brightness values of the first sub-pixels of the target color under the first grayscale in the first display region can be acquired by photographing the display panel to be compensated for the first time. That is, the corresponding CSV data of the first display region under the first grayscale can be obtained. The second acquired brightness values of the second sub-pixels of the target color under the first grayscale in the second display region can be acquired by photographing the display panel to be compensated for the second time. That is, the corresponding CSV data of the second display region under the first grayscale can be obtained. During the two photographing processes, different exposure factors can be used.

The first sub-pixels of the target color may be first sub-pixels of one color among at least three colors in the first display region. The second sub-pixels of the target color may be second sub-pixels of one color among at least three colors in the second display region. In step 202, the color of the first sub-pixels corresponding to the first acquired brightness values is the same as the color of the second sub-pixels corresponding to the second acquired brightness values. For a same display panel, the acquisition ratio corresponding to the sub-pixels of each color can be acquired according to the first sub-pixels and the second sub-pixels of each color.

In step 202, the acquisition ratio is a ratio of the average value of the plurality of first acquired brightness values and the average value of the plurality of second acquired brightness values.

For example, k_r1=Ave_Local_r1/Ave_main_r1, wherein k_r1 is the acquisition ratio corresponding to the red sub-pixels under the first grayscale of the display panel to be compensated. Ave_Local_r1 is the average value of the first acquired brightness values of the first sub-pixels of the red color under the first grayscale in the first display region of the display panel to be compensated. Ave_main_r1 is the average value of the second acquired brightness values of the second sub-pixels of the red color under the first grayscale in the second display region of the display panel to be compensated.

For another example, k_b1=Ave_Local_b1/Ave_main_b1, wherein k_b1 is the acquisition ratio corresponding to the blue sub-pixels under the first grayscale of the display panel to be compensated. Ave_Local_b1 is the average value of the first acquired brightness values of the first sub-pixels of the blue color under the first grayscale in the first display region of the display panel to be compensated. Ave_main_b1 is the average value of the second acquired brightness values of the second sub-pixels of the blue color under the first grayscale in the second display region of the display panel to be compensated.

For another example, k_g1=Ave_Local_g1/Ave_main_g1, wherein k_g1 is the acquisition ratio corresponding to the green sub-pixels under the first grayscale of the display panel to be compensated. Ave_Local_g1 is the average value of the first acquired brightness values of the first sub-pixels of the green color under the first grayscale in the first display region of the display panel to be compensated. Ave_main_g1 is the average value of the second acquired brightness values of the second sub-pixels of the green color under the first grayscale in the second display region of the display panel to be compensated.

Before step 202, the method for determining a brightness compensation parameter provided by the embodiments of the present application may further include: determining a coverage range of a preset compensation algorithm based on a sample display panel having a same model as the display panel to be compensated, and using the coverage range of the preset compensation algorithm as the standard range. Exemplarily, the model of the display panel to be compensated and the model of the sample display panel being the same may mean that they have the same structure, the same size, and the same resolution. For example, they may be display panels produced in the same batch.

The process of compensating the display panel includes compensating for the brightness difference between the first display region and the second display region of the display panel, so that the display brightness of the first display region and the second display region of the display panel are consistent. The inventor of the present application found that, no matter in any grayscale, there is an ideal standard range for the acquisition ratio of the average value of the plurality of first acquired brightness values to the average value of the plurality of second acquired brightness values acquired by the image acquisition device. Under a condition that the acquisition ratio is within the standard range, the compensation parameter of the display panel may be directly determined based on the first acquired brightness values and the second acquired brightness values, and the compensation effect implemented by using the compensation parameter is ideal. Under a condition that the acquisition ratio is not within the standard range, if the compensation parameter of the display panel is directly determined based on the first acquired brightness values and the second acquired brightness values, the compensation effect implemented by using the compensation parameter is not ideal, which will even cause over compensation.

Exemplarily, the plurality of first acquired brightness values of the plurality of first sub-pixels of the target color under the first grayscale in the first display region and the plurality of second acquired brightness values of the plurality of second sub-pixels of the target color under the first grayscale in the second display region of the sample display panel may be obtained by the image acquisition device for multiple times. After each acquisition of the brightness values, the compensation parameter of the sample display panel may be determined by using a preset compensation algorithm based on the first acquired brightness values and the second acquired brightness values. The sample display panel may be compensated based on the determined compensation parameter, and the compensation effects may be compared. The ratio of the average value of the first brightness values to the average value of the second brightness values corresponding to the ideal compensation effect may be calculated, and the range of the ratio corresponding to the ideal compensation effect may be used as the coverage range of the preset compensation algorithm, that is, the standard range.

The preset compensation algorithm may be any compensation algorithm, which is not limited in present application.

The standard range corresponding to the sub-pixels of each color may vary, which is not limited in present application. For example, the standard range corresponding to the red sub-pixels may be 2.25-2.65, the standard range corresponding to the green sub-pixels may be 2.4-2.8, and the standard range corresponding to the blue sub-pixels may be 3.0-3.4.

Figure 3:
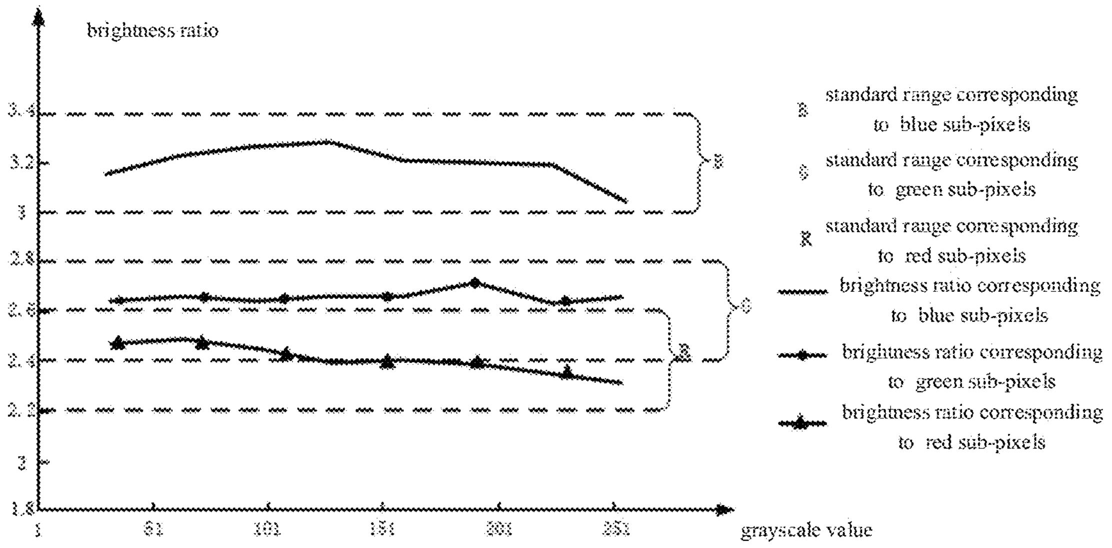
FIG. 3 is a schematic diagram of brightness ratios corresponding to sub-pixels of various colors of a sample display panel where the compensation effect meets the conditions provided by an embodiment of the present application.

For example, FIG. 3 is a schematic diagram of brightness ratios corresponding to sub-pixels of various colors of a sample display panel where the compensation effect meets the conditions provided by an embodiment of the present application. In FIG. 3, the abscissa represents the grayscale value, and the ordinate represents the ratio of the average brightness value of the sub-pixels of the target color in the first display region to the average brightness value of the sub-pixels of the target color in the second display region. As shown in FIG. 3, the ratio of the average brightness value of the red sub-pixels in the first display region to the average brightness value of the red sub-pixels in the second display region obtained based on the brightness data acquired by the image acquisition device is within the standard range corresponding to the red sub-pixels. The ratio of the average brightness value of the green sub-pixels in the first display region to the average brightness value of the green sub-pixels in the second display region obtained based on the brightness data acquired by the image acquisition device is within the standard range corresponding to the green sub-pixels. The ratio of the average brightness value of the blue sub-pixels in the first display region to the average brightness value of the blue sub-pixels in the second display region obtained based on the brightness data acquired by the image acquisition device is within the standard range corresponding to the blue sub-pixels. That is, the ratio of the average brightness value of the sub-pixels of the target color in the first display region to the average brightness value of the sub-pixels of the target color in the second display region acquired by the image acquisition device is within the standard range, and the corresponding compensation effect is ideal.

Figure 4:
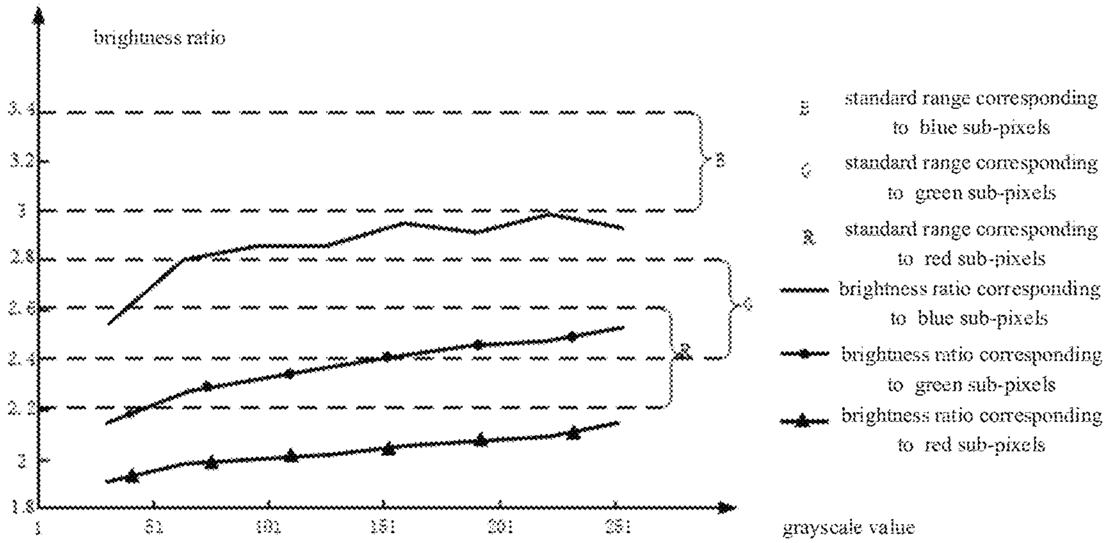
FIG. 4 is a schematic diagram of brightness ratios corresponding to sub-pixels of various colors of a sample display panel where the compensation effect does not meet the conditions provided by an embodiment of the present application.

For another example, FIG. 4 is a schematic diagram of brightness ratios corresponding to sub-pixels of various colors of a sample display panel where the compensation effect does not meet the conditions provided by an embodiment of the present application. In FIG. 4, the abscissa represents the grayscale value, and the ordinate represents the ratio of the average brightness value of the sub-pixels of the target color in the first display region to the average brightness value of the sub-pixels of the target color in the second display region. As shown in FIG. 4, the ratio of the average brightness value of the red sub-pixels in the first display region to the average brightness value of the red sub-pixels in the second display region obtained based on the brightness data acquired by the image acquisition device is not within the standard range corresponding to the red sub-pixels. The ratio of the average brightness value of the green sub-pixels in the first display region to the average brightness value of the green sub-pixels in the second display region obtained based on the brightness data acquired by the image acquisition device under some grayscales is not within the standard range corresponding to the green sub-pixels. The ratio of the average brightness value of the blue sub-pixels in the first display region to the average brightness value of the blue sub-pixels in the second display region obtained based on the brightness data acquired by the image acquisition device is not within the standard range corresponding to the blue sub-pixels. That is, the ratio of the average brightness value of the sub-pixels of the target color in the first display region to the average brightness value of the sub-pixels of the target color in the second display region acquired by the image acquisition device is generally lower than the standard range. Therefore, in the actual compensation process, the first display region may be over compensated, thereby deteriorate the brightness consistency between the first display region and the second display region.

In step 203, under a condition that the acquisition ratio is not within the standard range, at least one of i) the plurality of first acquired brightness values or ii) the plurality of second acquired brightness values may be corrected. For example, only the plurality of first acquired brightness values acquired by the image acquisition device may be corrected. That is, the corrected brightness value includes a plurality of first corrected brightness values of the plurality of first sub-pixels. For another example, only the plurality of second acquired brightness values acquired by the image acquisition device may be corrected. That is, the corrected brightness value includes a plurality of second corrected brightness values of the plurality of second sub-pixels. For another example, both the plurality of first acquired brightness values and the plurality of second acquired brightness values acquired by the image acquisition device may be corrected. That is, the corrected brightness value includes a plurality of first corrected brightness values of the plurality of first sub-pixels and a plurality of second corrected brightness values of the plurality of second sub-pixels.

In some optional embodiments, in order to guarantee the light transmittance of the first display region, the pixel density of the first display region may be smaller than the pixel density of the second display region. Moreover, the area of the first display region is also smaller than the area of the second display region. Therefore, the number of sub-pixels in the first display region is much smaller than the number of sub-pixels in the second display region. Therefore, only the plurality of first acquired brightness values acquired by the image acquisition device may be corrected. Exemplarily, step 203 may specifically include obtaining the plurality of first corrected brightness values by multiplying the plurality of first acquired brightness values by a correction coefficient, so that a corrected ratio of an average value of the plurality of first corrected brightness values to the average value of the plurality of second acquired brightness values is within the standard range. In this way, the amount of calculation can be reduced and the efficiency can be improved.

Specifically, under a condition that the acquisition ratio under the first grayscale is less than the minimum value of the standard range, the correction coefficient may be a value greater than 1. Under a condition that the acquisition ratio under the first grayscale is greater than the maximum value of the standard range, the correction coefficient may be a value less than 1.

In some optional embodiments, under a condition that the acquisition ratio is within the standard range, there is no need to correct the plurality of first acquired brightness values or the plurality of second acquired brightness values. The brightness compensate parameter may be directly determined based on the plurality of first acquired brightness values and the plurality of second acquired brightness values, and the brightness difference between the first display region and the second display region may be compensated.

In some optional embodiments, before the obtaining the plurality of first corrected brightness values by multiplying the plurality of first acquired brightness values by a correction coefficient, the method for determining a brightness compensation parameter provided by the embodiments of the present application may further include determining the correction coefficient according to a degree to which the acquisition ratio deviates from the standard range. In this way, the correction coefficient can be prevented from being too large or too small, and thus the first corrected brightness values can be prevented from being too large or too small.

Exemplarily, the plurality of first brightness values of the plurality of first sub-pixels of the target color under the first grayscale in the first display region and the plurality of second brightness values of the plurality of second sub-pixels of the target color under the first grayscale in the second display region of the sample display panel may be obtained by the image acquisition device. The ratio of the average value of the plurality of first brightness values to the average value of the plurality of second brightness values is not within the standard range. In the followings, the ratio that is not within the standard range will be referred as the sample ratio. The degree to which the sample ratio deviates from the standard range may be calculated. Exemplarily, the difference between the sample ratio and the central value of the standard range may be used as the degree of deviation. Alternatively, under a condition that the sample ratio is greater than the maximum value of the standard range, the difference between the sample ratio and the maximum value of the standard range may be used as the degree of deviation. Alternatively, under a condition that the sample ratio is less than the minimum value of the standard range, the difference between the minimum value of the standard range and the sample ratio may be used as the degree of deviation, which is not limited in the present application. Further, different correction coefficients can be set for the same degree of deviation, and the first brightness values can be corrected based on the different correction coefficients. In addition, the compensation effect based on the first brightness value after correction can be analyzed, and the correction coefficient corresponding to the relatively ideal compensation effect can be selected as the final correction coefficient.

Exemplarily, the correction coefficients corresponding to each degree of deviation can be set according to the above method, and the correspondence between each degree of deviation and the correction coefficients can be stored in advance. Alternatively, a plurality of deviation ranges and the correction coefficients corresponding to the plurality of deviation range can be set, and the correspondence between the plurality of deviation ranges and the correction coefficients can be stored in advance. Therefore, in the actual determination process of the brightness compensation parameter, the corresponding correction coefficient can be searched in the pre-stored correspondence according to the degree to which the acquisition ratio deviates from the standard range.

In some optional embodiments, the determining the correction coefficient according to a degree to which the acquisition ratio deviates from the standard range may include: obtaining an intervention range; wherein the intervention range has a same central value as the standard range, and the intervention range is greater than the standard range; determining a first deviation value according to a difference between the intervention range and the acquisition ratio; determining the correction coefficient according to a relationship between the first deviation value and the intervention range.

Exemplarily, the intervention range can be understood as the upper limit range that can be covered by the preset compensation algorithm. Under a condition that the acquisition ratio is within the intervention range and not within the standard range, compensating the brightness difference between the first display region and the second display region directly based on the first acquired brightness values and the second acquired brightness values can achieve a certain compensation effect, but the compensation effect is not ideal.

Exemplarily, the intervention range may be determined based on the sample display panel. For example, the plurality of first acquired brightness values of the plurality of first sub-pixels of the target color under the first grayscale in the first display region and the plurality of second acquired brightness values of the plurality of second sub-pixels of the target color under the first grayscale in the second display region of the sample display panel may be obtained by the image acquisition device for multiple times. After each acquisition of the brightness values, the sample display panel may be compensated by using a preset compensation algorithm based on the first acquired brightness values and the second acquired brightness values, and the compensation effects may be compared. The ratio of the average value of the first brightness values to the average value of the second brightness values corresponding to the situation that there is a certain compensation effect but the compensation effect is not ideal may be calculated. Then, the range of the ratio corresponding to the situation that there is a certain compensation effect but the compensation effect is not ideal may be used as the coverage range of the preset compensation algorithm, that is, the intervention range.

The intervention ranges corresponding to the sub-pixels of different colors may be different, which is not limited in the present application. For example, under a condition that the standard range corresponding to the red sub-pixels is 2.25-2.65, the standard range corresponding to the green sub-pixels is 2.4-2.8, and the standard range corresponding to the blue sub-pixels is 3.0-3.4, the intervention range corresponding to the red sub-pixels may be 1.95-2.95, the intervention range corresponding to the green sub-pixels may be 2.1-3.1, and the intervention range corresponding to the blue sub-pixels may be 1.7-3.7.

Exemplarily, under a condition that the first deviation value is within the intervention range, the correction coefficient may be determined according to formula (1):

$$\theta = \frac{\text{step}_{ideal}}{k} \tag{1}$$

Under a condition that the first deviation value is greater than a maximum value of the intervention range, the correction coefficient may be determined according to formula (2):

$$\theta = \frac{\alpha + \beta}{k} \tag{2}$$

Under a condition that the first deviation value is smaller than a minimum value of the intervention range, the correction coefficient may be determined according to formula (3):

$$\theta = \frac{\alpha - \beta}{k} \tag{3}$$

wherein θ is the correction coefficient, (α−β, α+β) is the standard range, and (α−Ω, α+Ω) is the intervention range, α, β, Ω are constants, α>0, Ω>β≥0, and α is the central value of the standard range and the intervention range, k is the acquisition ratio, $\text{step}_k$ is the first deviation value, and $\text{step}_k=|\alpha+\Omega-k|$, $\text{step}_\alpha$ is a second deviation value obtained by mapping the first deviation value into the standard range, and $$\text{step}_\alpha = \frac{\text{step}_k}{\Omega/\beta},$$

$\text{step}_{ideal}$ is an ideal ratio, and $\text{step}_{ideal}=\alpha+\beta-\text{step}_\alpha$.

Exemplarily, for sub-pixels of any color, the value of β may be 0.2, and the value of Ω may be 0.5. The value of α may be 2.45 for red sub-pixels, 2.6 for green sub-pixels, and 3.2 for blue sub-pixels. Of course, in order to guarantee the accuracy, the values of α, β, and Ω can keep three decimal places. For example, the value of α can be 3.208 for the blue sub-pixels. α, β, and Ω can be determined according to actual conditions, which are not limited in the present application.

Figure 5:
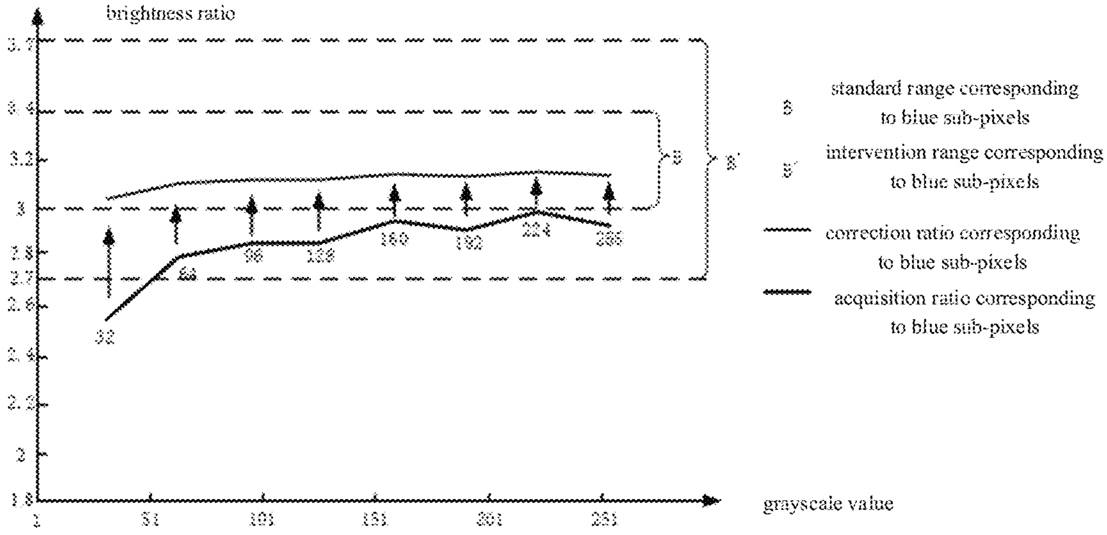
FIG. 5 is a schematic diagram of acquisition ratios and correction ratios corresponding to blue sub-pixels in a display panel provided by an embodiment of the present application.

For example, FIG. 5 is a schematic diagram of acquisition ratios and correction ratios corresponding to blue sub-pixels in a display panel provided by an embodiment of the present application. In FIG. 5, the abscissa represents the grayscale value, and the ordinate represents the ratio of the average brightness value of the sub-pixels of the target color in the first display region to the average brightness value of the sub-pixels of the target color in the second display region. Exemplarily, the schematic diagram of the acquisition ratios shown in FIG. 5 may be obtained by the brightness acquisition device acquiring the brightness values of the display panel to be compensated under grayscale 32, grayscale 64, grayscale 96, grayscale 128, grayscale 160, grayscale 192, grayscale 224, and grayscale 255. In FIG. 5, the acquisition ratios under the plurality of grayscales are not within the standard range corresponding to the blue sub-pixels, and the first deviation values corresponding to the plurality of grayscale values are less than the minimum value of the intervention range. The correction coefficients can be calculated according to the above formula (3). The schematic diagram of the correction ratios shown in FIG. 5 may be obtained by correcting the brightness values of the blue sub-pixels in the first display region in the display panel to be compensated based on the calculated correction coefficients. As shown in FIG. 5, the change trend of the correction ratios under the plurality of grayscale values is consistent with the change trend of the acquisition ratios under the plurality of grayscale values. For example, the acquisition ratio under grayscale 64 is greater than the acquisition ratio under grayscale 32, and correspondingly, the correction ratio under grayscale 64 is also greater than the correction ratio under grayscale 32. For another example, the acquisition ratio under grayscale 192 is smaller than the acquisition ratio under grayscale 160, and the correction ratio under grayscale 192 is also smaller than the correction ratio under grayscale 60.

Figure 6:
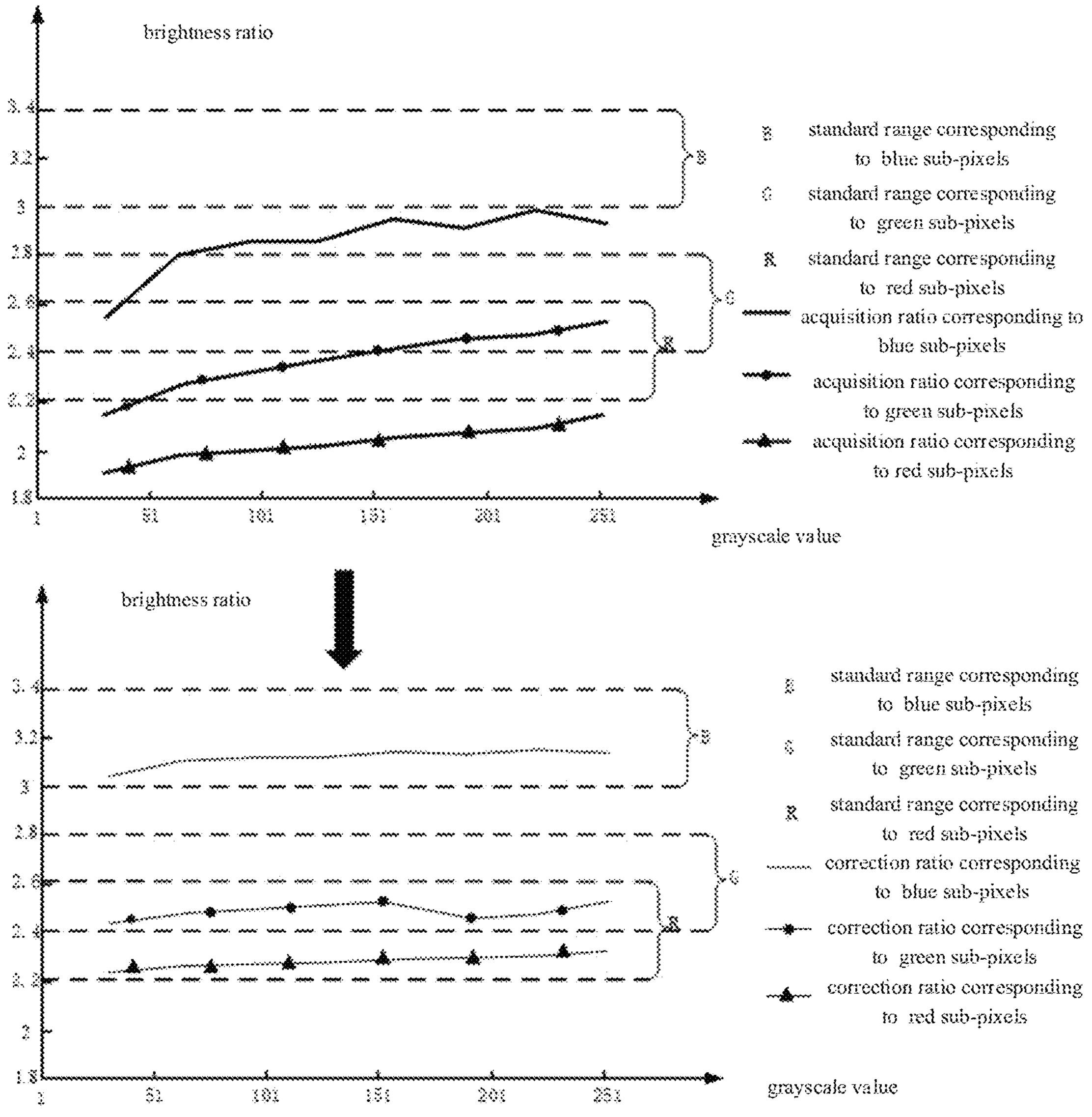
FIG. 6 is a schematic diagram of brightness ratios of sub-pixels of various colors of a display panel before and after correction provided by an embodiment of the present application.

For example, FIG. 6 is a schematic diagram of brightness ratios of sub-pixels of various colors of a display panel before and after correction provided by an embodiment of the present application. In FIG. 6, the abscissa represents the grayscale value, and the ordinate represents the ratio of the average brightness value of the sub-pixels of the target color in the first display region to the average brightness value of the sub-pixels of the target color in the second display region. As shown in FIG. 6, the change trend of the correction ratios corresponding to the red sub-pixels under the plurality of grayscale values is consistent with the change trend of the acquisition ratios corresponding to the red sub-pixels under the plurality of grayscale values. The change trend of the correction ratios corresponding to the green sub-pixels under the plurality of grayscale values is consistent with the change trend of the acquisition ratios corresponding to the green sub-pixels under the plurality of grayscale values. The change trend of the correction ratios corresponding to the blue sub-pixels under the plurality of grayscale values is consistent with the change trend of the acquisition ratios corresponding to the blue sub-pixels under the plurality of grayscale values. Here, the acquisition ratios under some grayscale values corresponding to the green sub-pixels are within the standard range corresponding to the green sub-pixels. Therefore, the acquisition ratios under these grayscale values are not corrected.

According to the method for determining the correction coefficients provided by the embodiments of the present application, the change trend of the correction ratios under the plurality of grayscale values can be guaranteed to be consistent with the change trend of the acquisition ratios under the plurality of grayscale values. Therefore, the problem of color shift in the first display region after correction can be avoided.

As described above, only the first acquired brightness values may be corrected, that is, the corrected brightness value includes the first corrected brightness values. The brightness compensation parameter may include a compensation grayscale value. In some optional embodiments, in step 204, the determining the brightness compensation parameter of the display panel to be compensated based on the corrected brightness value may include: determining a first average brightness value of the first display region according to the plurality of first corrected brightness values of the plurality of first sub-pixels; determining a second average brightness value of the second display region according to the plurality of second acquired brightness values of the plurality of second sub-pixels; determining a first grayscale value corresponding to the first average brightness value and a second grayscale value corresponding to the second average brightness value according to a correspondence relationship between brightness values of the display panel to be compensated and grayscale values; using a difference between the second grayscale value and the first grayscale value as the compensation grayscale value for the plurality of first sub-pixels. As described above, the number of sub-pixels in the first display region is usually much smaller than the number of sub-pixels in the second display region. The second average brightness value of the second display region is determined as the target brightness value, and the compensation parameter is determined only for the first sub-pixels in the first display region. Therefore, the amount of calculation can be reduced and the efficiency can be improved.

Figure 7:
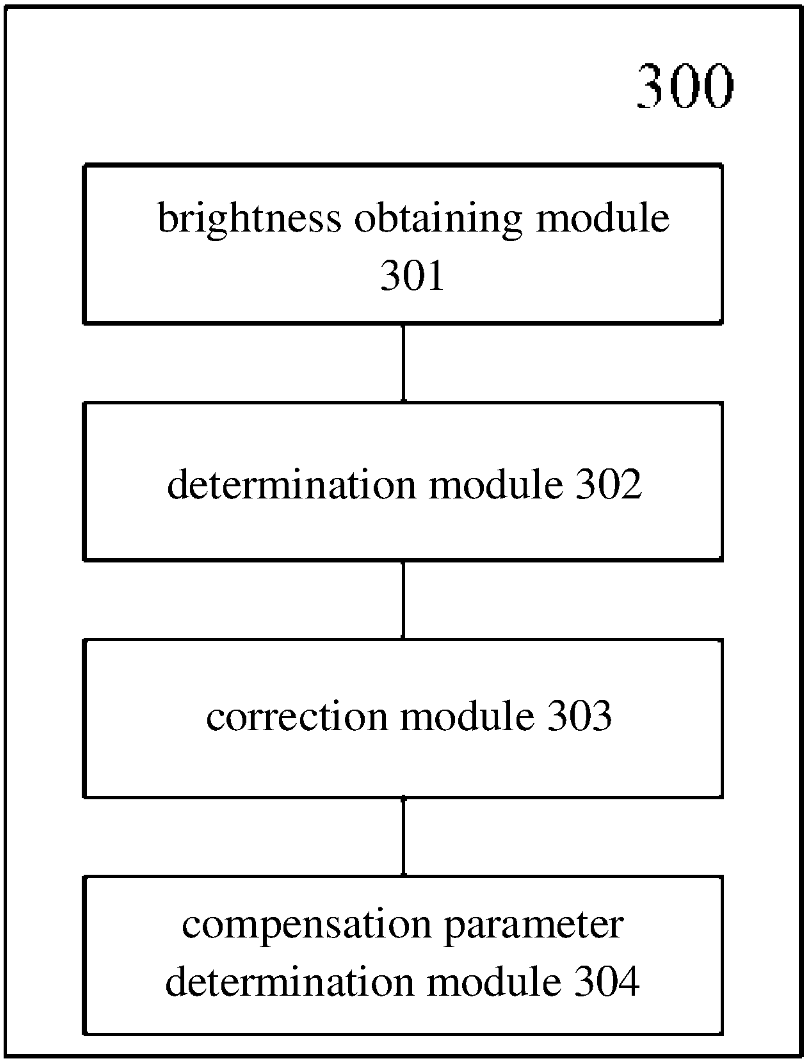
FIG. 7 is a schematic structural diagram of an example of a device for determining a brightness compensation parameter provided by an embodiment of the present application.

The embodiments of the present application also provide a device for determining a brightness compensation parameter. The device for determining a brightness compensation parameter can be used for the display panel in the above-mentioned embodiments. The specific content of the display panel can be referred to the relevant description in the above-mentioned embodiments, which will not be repeated here. FIG. 7 is a schematic structural diagram of an example of a device for determining a brightness compensation parameter provided by an embodiment of the present application. As shown in FIG. 7, the device for determining a brightness compensation parameter may include a brightness obtaining module 301, a determination module 302, an correction module 303, and a compensation parameter determination module 304.

The brightness obtaining module 301 is configured to obtain, at any grayscale, a plurality of first acquired brightness values of a plurality of first sub-pixels of a target color in the first display region and a plurality of second acquired brightness values of a plurality of second sub-pixels of the target color in the second display region of the display panel to be compensated.

The determination module 302 is configured to determine whether an acquisition ratio of an average value of the plurality of first acquired brightness values to an average value of the plurality of second acquired brightness values is within a standard range. Here, the standard range is determined according to a sample display panel The correction module 303 is configured to correct, under a condition that the acquisition ratio is not within the standard range, at least one of i) the plurality of first acquired brightness values or ii) the plurality of second acquired brightness values to obtain a corrected brightness value of the display panel to be compensated, so that a corrected ratio of an average brightness value of the plurality of first sub-pixels of the target color to an average brightness value of the plurality of second sub-pixels of the target color after correction is within the standard range, and wherein the corrected brightness value includes at least one of i) a plurality of first corrected brightness values of the plurality of first sub-pixels or ii) a plurality of second corrected brightness values of the plurality of second sub-pixels.

The compensation parameter determination module 304 is configured to use the corrected brightness value as a display brightness value of the display panel to be compensated, and determine the brightness compensation parameter of the display panel to be compensated based on the corrected brightness value.

According to the device for determining a brightness compensation parameter provided by the embodiments of the present application, after correcting at least one of i) the plurality of first acquired brightness values or ii) the plurality of second acquired brightness values to obtain a corrected brightness value, the corrected ratio of the average brightness value of the plurality of first sub-pixels of the target color to the average brightness value of the plurality of second sub-pixels of the target color after correction is within the standard range. Then, the brightness compensation parameter of the display panel to be compensated is determined based on the corrected brightness value. The corrected brightness value is more in line with the actual display situation of the display panel to be compensated. That is, the problem of distortion of the plurality of first acquired brightness values and/or the plurality of second acquired brightness values due to the instability of the brightness obtaining device can be avoided. Further, a reasonable corrected brightness value can be used to determine the brightness compensation parameter of the display panel to be compensated, thereby improving the compensation effect of the display panel and improving the display uniformity of the display panel.

In some embodiments, the correction module 303 is specifically configured to obtain the plurality of first corrected brightness values by multiplying the plurality of first acquired brightness values by a correction coefficient, so that a corrected ratio of an average value of the plurality of first corrected brightness values to the average value of the plurality of second acquired brightness values is within the standard range.

Figure 8:
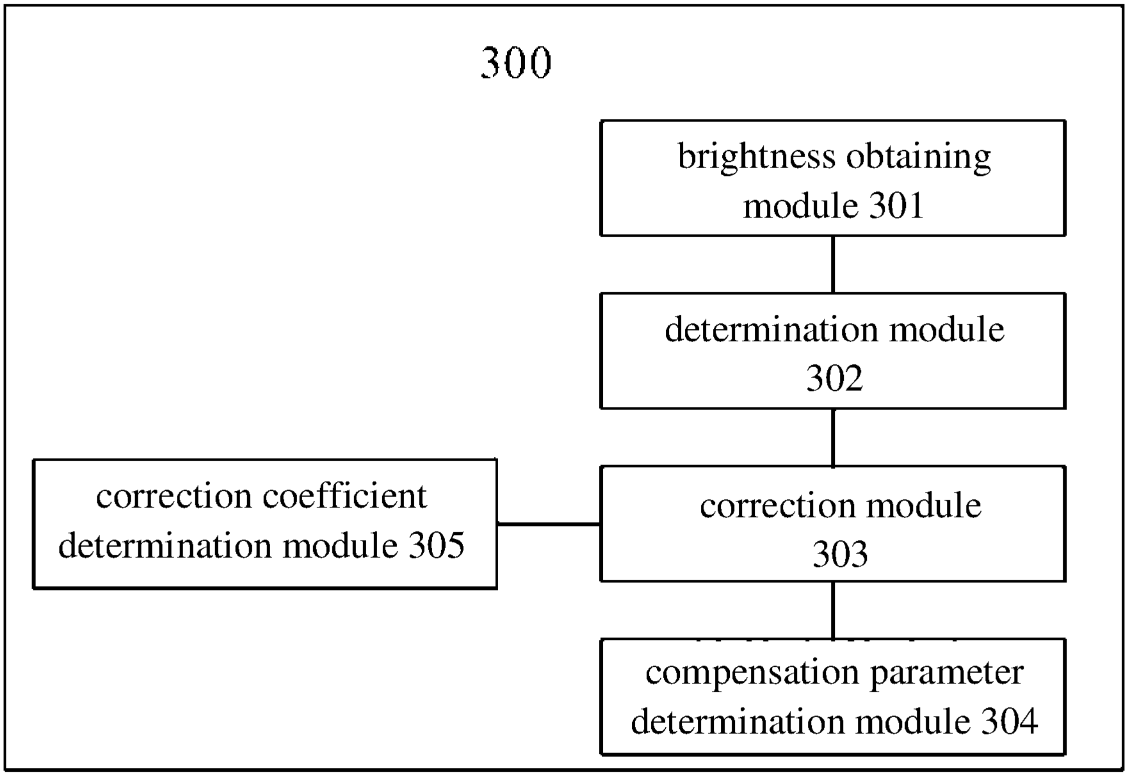
FIG. 8 is a schematic structural diagram of another example of a device for determining a brightness compensation parameter provided by an embodiment of the present application.

FIG. 8 is a schematic structural diagram of another example of a device for determining a brightness compensation parameter provided by an embodiment of the present application. The difference between FIG. 8 and FIG. 7 is that the device 300 for determining a brightness compensation parameter shown in FIG. 8 may further include a correction coefficient determination module 305.

In some embodiments, the correction coefficient determination module 305 may be configured to determine the correction coefficient according to a degree to which the acquisition ratio deviates from the standard range.

In some embodiments, the correction coefficient determination module 305 may be configured to: set an intervention range, wherein the intervention range has a same central value as the standard range, and the intervention range is greater than the standard range; determine a first deviation value according to a difference between the intervention range and the acquisition ratio; determine the correction coefficient according to a relationship between the first deviation value and the intervention range.

In some embodiments, the correction coefficient determination module 305 may be configured to: determine the correction coefficient according to the above formula (1) under a condition that the first deviation value is within the intervention range; determine the correction coefficient according to the above formula (2) under a condition that the first deviation value is greater than a maximum value of the intervention range; determine the correction coefficient according to the above formula (3) under a condition that the first deviation value is smaller than a minimum value of the intervention range.

In some embodiments, the compensation parameter determination module 304 may be configured to: determine a first average brightness value of the first display region according to the plurality of first corrected brightness values of the plurality of first sub-pixels; determine a second average brightness value of the second display region according to the plurality of second acquired brightness values of the plurality of second sub-pixels; determine a first grayscale value corresponding to the first average brightness value and a second grayscale value corresponding to the second average brightness value according to a correspondence relationship between brightness values of the display panel to be compensated and grayscale values; use a difference between the second grayscale value and the first grayscale value as the compensation grayscale value for the plurality of first sub-pixels.

Figure 9:
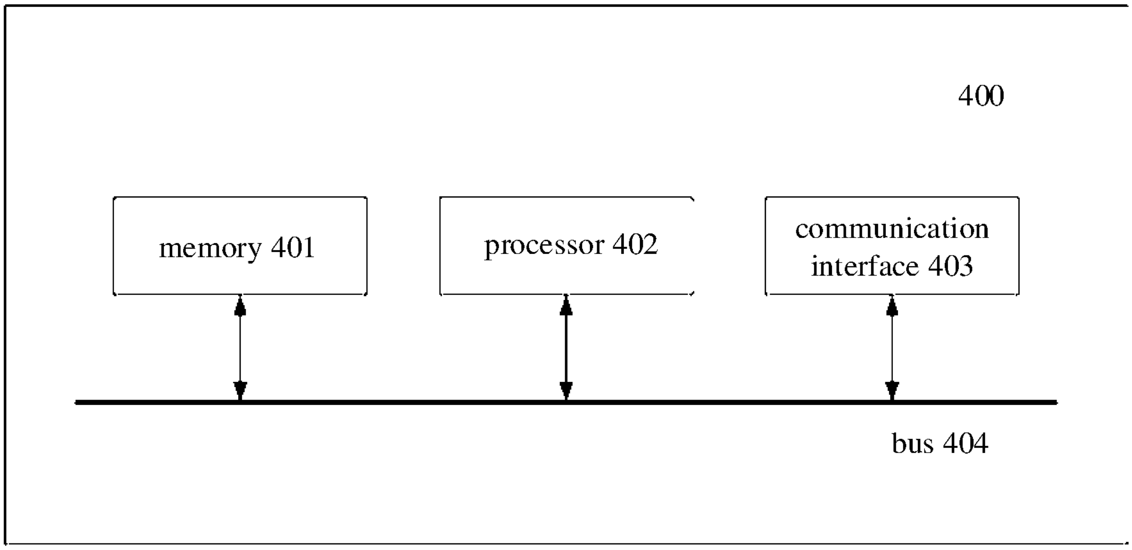
FIG. 9 is a schematic structural diagram of an apparatus for determining a brightness compensation parameter provided by an embodiment of the present application.

FIG. 9 is a schematic structural diagram of an apparatus for determining a brightness compensation parameter provided by an embodiment of the present application. As shown in FIG. 9, the apparatus 400 for determining a brightness compensation parameter includes a memory 401, a processor 402, and a computer program stored on the memory 401 and executable by the processor 402.

In one example, the above-mentioned processor 402 may include a central processing unit (CPU) or an application specific integrated circuit (ASIC), or may be configured as one or more integrated circuits implementing the embodiments of the present application.

The memory 401 may include a large-capacity memory for data or instructions. For example and without limitation, the memory 401 may include a hard disk drive (HDD), a floppy disk drive, a flash memory, an optical disk, a magneto-optical disk, a magnetic tape, or a universal serial bus (USB) drive, or a combination of two or more thereof. Where appropriate, the memory 401 may include a removable or non-removable (or fixed) medium. Where appropriate, the memory 401 may be inside or outside the apparatus 400 for determining a brightness compensation parameter. In a particular embodiment, the memory 401 is a non-volatile solid-state memory. In a particular embodiment, the memory 401 may be a read only memory (ROM). Where appropriate, the ROM may be a mask-programmed ROM, a programmable ROM (PROM), an erasable PROM (EPROM), an electrically erasable PROM (EEPROM), an electrically rewriteable ROM (EAROM), or a flash memory or a combination of two or more thereof.

The processor 402 reads the executable program code stored in the memory 401 and executes the computer program corresponding to the executable program code, so as to implement the method for determining a brightness compensation parameter in the above-mentioned embodiments.

In an example, the apparatus 400 for determining a brightness compensation parameter may further include a communication interface 403 and a bus 404. Here, as shown in FIG. 9, the memory 401, the processor 402, and the communication interface 403 are connected through the bus 404 and complete communication with each other.

The communication interface 403 is mainly configured to implement communication between various modules, apparatuses, units and/or devices in the embodiments of the present application. Input devices and/or output devices may also be accessed through the communication interface 403.

The bus 404 includes hardware, software, or both, and couples the components of the apparatus 400 for determining a brightness compensation parameter to each other. By way of example and without limitation, the bus 404 may include an accelerated graphics port (AGP) or other graphics bus, an enhanced industry standard architecture (EISA) bus, a front side bus (FSB), a hyper transport (HT) interconnection, an industry standard architecture (ISA) bus, an unlimited bandwidth interconnection, a low pin count (LPC) bus, a memory bus, a microchannel architecture (MCA) bus, a peripheral component interconnection PCI bus, a PCI-Express (PCI-X) bus, a serial advanced technology attachment (SATA) bus, a video electronics standards association local (VLB) bus or other suitable bus, or a combination of two or more thereof. Where appropriate, the bus 404 may include one or more buses. Although the embodiments of the present application describe and show a specific bus, the present application considers any suitable bus or interconnect.

The embodiments of the present application further provide a computer-readable storage medium having a computer program stored thereon. The computer program, when executed by a processor, implements the method for determining a brightness compensation parameter in the above-mentioned embodiments, which can achieve the same technical effect. In order to avoid repetition, details are not repeated here. The computer-readable storage medium may include a read-only memory (ROM), a random access memory (RAM), a magnetic disk or an optical disk, which are not limited herein.

The embodiments of the present application as described above do not exhaust all the details and do not limit the scope of the present application. Obviously, those skilled in the art can make many modifications and variations in light of the above description. These embodiments are specifically described in this specification to better explain the principles and the practical applications of the present application, so that those skilled in the art can make good use of the present application and modifications based on the present application. The scope of the present application is limited only by the appended claims.

What is claimed is:

1. A method for determining a brightness compensation parameter of a display panel to be compensated, the display panel to be compensated has a first display region and a second display region, and the method comprises:

obtaining, at any grayscale, a plurality of first acquired brightness values of a plurality of first sub-pixels of a target color in the first display region and a plurality of second acquired brightness values of a plurality of second sub-pixels of the target color in the second display region of the display panel to be compensated;

determining whether an acquisition ratio of an average value of the plurality of first acquired brightness values to an average value of the plurality of second acquired brightness values is within a standard range, wherein the standard range is determined according to a sample display panel;

correcting, under a condition that the acquisition ratio is not within the standard range, at least one of i) the plurality of first acquired brightness values or ii) the plurality of second acquired brightness values to obtain a corrected brightness value of the display panel to be compensated, so that a corrected ratio of an average brightness value of the plurality of first sub-pixels of the target color to an average brightness value of the plurality of second sub-pixels of the target color after correction is within the standard range, and wherein the corrected brightness value comprises at least one of i) a plurality of first corrected brightness values of the plurality of first sub-pixels or ii) a plurality of second corrected brightness values of the plurality of second sub-pixels;

using the corrected brightness value as a display brightness value of the display panel to be compensated, and determining the brightness compensation parameter of the display panel to be compensated based on the corrected brightness value, wherein correcting, under the condition that the acquisition ratio is not within the standard range, comprises:

obtaining the plurality of first corrected brightness values by multiplying the plurality of first acquired brightness values by a correction coefficient, so that a corrected ratio of an average value of the plurality of first corrected brightness values to an average value of the plurality of second acquired brightness values is within the standard range, and wherein before the obtaining the plurality of first corrected brightness values by multiplying the plurality of first acquired brightness values by the correction coefficient, the method further comprises:

determining the correction coefficient according to a degree to which the acquisition ratio deviates from the standard range, which comprises:

obtaining an intervention range; wherein the intervention range has a same central value as the standard range, and the intervention range is greater than the standard range;

determining a first deviation value according to a difference between the intervention range and the acquisition ratio; and determining the correction coefficient according to a relationship between the first deviation value and the intervention range.

2. The method according to claim 1, wherein determining the correction coefficient according to the relationship between the first deviation value and the intervention range comprises:

determining, under a condition that the first deviation value is within the intervention range, the correction coefficient according to formula (1):

$$\theta = \frac{\text{step}_{ideal}}{k} \tag{1}$$

determining, under a condition that the first deviation value is greater than a maximum value of the intervention range, the correction coefficient according to formula (2):

$$\theta = \frac{\alpha + \beta}{k} \tag{2}$$

determining, under a condition that the first deviation value is smaller than a minimum value of the intervention range, the correction coefficient according to formula (3):

$$\theta = \frac{\alpha - \beta}{k} \tag{3}$$

wherein θ is the correction coefficient, $(\alpha-\beta, \alpha+\beta)$ is the standard range, and $(\alpha-\Omega, \alpha+\Omega)$ is the intervention range, α, β, Ω are constants, $\alpha>0$, $\Omega>\beta\geq 0$, and α is the central value of the standard range and the intervention range, k is the acquisition ratio, $\text{step}_k$ is the first deviation value, and $\text{step}_k=|\alpha+\Omega-k|$, $\text{step}_\alpha$ is a second deviation value obtained by mapping the first deviation value into the standard range, and $$\text{step}_\alpha = \frac{\text{step}_k}{\Omega/\beta},$$

$\text{step}_{ideal}$ is an ideal ratio, and $\text{step}_{ideal}=\alpha+\beta-\text{step}_\alpha$.

3. The method according to claim 1, wherein before determining whether the acquisition ratio of the average value of the plurality of first acquired brightness values to the average value of the plurality of second acquired brightness values is within the standard range, the method further comprises determining a coverage range of a preset compensation algorithm based on the sample display panel having a same model as the display panel to be compensated; and using the coverage range of the preset compensation algorithm as the standard range.

4. An apparatus for determining a brightness compensation parameter, comprising a processor and a non-transitory computer readable storage medium which are configured to execute the method according to claim 1.

5. A method for determining a brightness compensation of a display panel to be compensated, the display panel to be compensated has a first display region and a second display region, and the method comprises:

obtaining, at any grayscale, a plurality of first acquired brightness values of a plurality of first sub-pixels of a target color in the first display region and a plurality of second acquired brightness values of a plurality of second sub-pixels of the target color in the second display region of the display panel to be compensated;

determining whether an acquisition ratio of an average value of the plurality of first acquired brightness values to an average value of the plurality of second acquired brightness values is within a standard range, wherein the standard range is determined according to a sample display panel;

correcting, under a condition that the acquisition ratio is not within the standard range, at least one of i) the plurality of first acquired brightness values or ii) the plurality of second acquired brightness values to obtain a corrected brightness value of the display panel to be compensated, so that a corrected ratio of an average brightness value of the plurality of first sub-pixels of the target color to an average brightness value of the plurality of second sub-pixels of the target color after correction is within the standard range, and wherein the corrected brightness value comprises at least one of i) a plurality of first corrected brightness values of the plurality of first sub-pixels or ii) a plurality of second corrected brightness values of the plurality of second sub-pixels; and using the corrected brightness value as a display brightness value of the display panel to be compensated, and determining the brightness compensation parameter of the display panel to be compensated based on the corrected brightness value, wherein correcting, under a condition that the acquisition ratio is not within the standard range, comprises:

obtaining the plurality of first corrected brightness values by multiplying the plurality of first acquired brightness values by a correction coefficient, so that a corrected ratio of an average value of the plurality of first corrected brightness values to the average value of the plurality of second acquired brightness values is within the standard range, wherein the brightness compensation parameter comprises a compensation grayscale value, and determining the brightness compensation parameter of the display panel to be compensated based on the corrected brightness value comprises:

determining a first average brightness value of the first display region according to the plurality of first corrected brightness values of the plurality of first sub-pixels;

determining a second average brightness value of the second display region according to the plurality of second acquired brightness values of the plurality of second sub-pixels;

determining a first grayscale value corresponding to the first average brightness value and a second grayscale value corresponding to the second average brightness value according to a correspondence relationship between brightness values of the display panel to be compensated and grayscale values; and using a difference between the second grayscale value and the first grayscale value as the compensation grayscale value for the plurality of first sub-pixels.

6. A device for determining a brightness compensation parameter of a display panel to be compensated, the display panel to be compensated has a first display region and a second display region, and the device is configured to:

obtain, at any grayscale, a plurality of first acquired brightness values of a plurality of first sub-pixels of a target color in the first display region and a plurality of second acquired brightness values of a plurality of second sub-pixels of the target color in the second display region of the display panel to be compensated;

determine whether an acquisition ratio of an average value of the plurality of first acquired brightness values to an average value of the plurality of second acquired brightness values is within a standard range, wherein the standard range is determined according to a sample display panel;

correct, under a condition that the acquisition ratio is not within the standard range, at least one of i) the plurality of first acquired brightness values or ii) the plurality of second acquired brightness values to obtain a corrected brightness value of the display panel to be compensated, so that a corrected ratio of an average brightness value of the plurality of first sub-pixels of the target color to an average brightness value of the plurality of second sub-pixels of the target color after correction is within the standard range, and wherein the corrected brightness value comprises at least one of i) a plurality of first corrected brightness values of the plurality of first sub-pixels or ii) a plurality of second corrected brightness values of the plurality of second sub-pixels; and use the corrected brightness value as a display brightness value of the display panel to be compensated, and determine the brightness compensation parameter of the display panel to be compensated based on the corrected brightness value, wherein correcting, under the condition that the acquisition ratio is not within the standard range, comprises:

obtaining the plurality of first corrected brightness values by multiplying the plurality of first acquired brightness values by a correction coefficient, so that a corrected ratio of an average value of the plurality of first corrected brightness values to an average value of the plurality of second acquired brightness values is within the standard range, and wherein, before the obtaining the plurality of first corrected brightness values by multiplying the plurality of first acquired brightness values by the correction coefficient, the device is further configured to:

determine the correction coefficient according to a degree to which the acquisition ratio deviates from the standard range, which comprises:

obtaining an intervention range; wherein the intervention range has a same central value as the standard range, and the intervention range is greater than the standard range;

determining a first deviation value according to a difference between the intervention range and the acquisition ratio; and determining the correction coefficient according to a relationship between the first deviation value and the intervention range.

* * * * *